United States Patent [19]

Sturm et al.

[11] 3,820,974

[45] June 28, 1974

[54] CONTROL OF WEEDS WITH N-CARBENYL DERIVATIVES OF AZABICYCLOOCTANES

[75] Inventors: Elmar Sturm, Arlesheim, Basel Land; Christian Vogel, Binningen, Basel Land, both of Switzerland

[73] Assignee: Ciba-Geigy Corporation, Ardsley, N.Y.

[22] Filed: Aug. 14, 1972

[21] Appl. No.: 280,610

Related U.S. Application Data

[62] Division of Ser. No. 61,442, Aug. 5, 1970, Pat. No. 3,705,165.

[52] U.S. Cl. ............................. 71/94, 71/66, 71/67, 71/74, 71/76, 71/95
[51] Int. Cl. ................................. A01n 9/12
[58] Field of Search .................. 71/94, 95

[56] References Cited
UNITED STATES PATENTS

| | | | |
|---|---|---|---|
| 3,133,947 | 5/1964 | Tilles | 71/94 X |
| 3,198,786 | 8/1965 | Tilles et al. | 71/88 X |
| 3,344,134 | 9/1967 | D'Amico | 71/88 X |
| 3,661,916 | 5/1972 | Sturm et al. | 71/94 X |

Primary Examiner—James O. Thomas, Jr.
Attorney, Agent, or Firm—Harry Falber; Frederick H. Robin

[57] ABSTRACT

Compounds of the formula

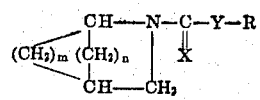

wherein
R — represents lower alkyl, lower halogenalkyl, lower alkenyl, lower halogenalkenyl, cycloalkyl or cycloalkenyl,
m — represents the integer 2 or 3,
n — represents the integer 1 or 2
whereby the sum of $m + n = 4$, and of the symbols X and Y one represents sulphur and the other represents oxygen or sulphur,
are disclosed as herbicidally active substances. Compositions as well as a method for controlling weeds and wild grasses with the aid of such compounds are also described.

14 Claims, No Drawings

CONTROL OF WEEDS WITH N-CARBENYL DERIVATIVES OF AZABICYCLOOCTANES

This is a division of application Ser. No. 61,442 filed on Aug. 5, 1970, now U.S. Pat. No. 3,705,165.

The present invention concerns new substituted azabicyclooctanes, process for the production thereof as well as herbicidal compositions containing such substituted azabicyclooctanes as active ingredients and method for the control of grass-type and broad-leaf weeds using the new active substance or compositions containing them.

Herbicidal N-polymethylene thiocarbamates, N-oxypolymethylene thiocarbamates and 3-azabicyclononane-thiolcarbamates have been described in U.S. Pat. Nos. 3,133,947; 3,198,786 and 3,344,134. Their known action is, however, limited to grass-type weeds by application of the active substances before germination or emergence of the plants.

It has now been found that new substituted azabicyclooctanes of Formula I

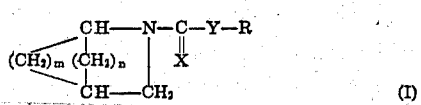
(I)

wherein
R — represents lower alkyl, lower halogenalkyl, lower alkenyl, lower halogenalkenyl, cycloalkyl or cycloalkenyl,
m — represents the integer 2 or 3,
n — represents the integer 1 or 2
whereby the sum of $m + n = 4$, and of the symbols X and Y, one represents sulphur and the other represents oxygen or sulphur, possess excellent herbicidal properties and are particularly suitable for the control of grass-type and broad-leaf weeds in various plantations.

The expression "substituted azabicyclooctanes" is used here and in the following for 6-azabicyclo[3.2.1]octane and 2-azabicyclo [2.2.2]octane, which are substituted at the nitrogen atom in the 6- and 2-positions, respectively, by a modified carboxyl group.

In Formula I, lower alkyl as R designates straight or branched-chain radicals having from 1 to 6, preferably from one to four carbon atoms, e.g. methyl, ethyl, propyl, isopropyl, n-butyl, sec-butyl, tert-butyl, etc. Such a lower alkyl may be mono- or poly-substituted by halogen, namely fluorine, chlorine, bromine or iodine. Suitable as lower alkenyl are, in particular, radicals having from three to six, preferably three or four carbon atoms, such as the allyl or methallyl radical, a propenyl or butenyl radical. Such alkenyl radicals may also be mono- or poly-substituted by fluorine, chlorine, bromine or iodine. Cycloalkyl radicals R can have up to six carbon atoms as ring members. The following cycloalkyl radicals, for example, are suitable:

cyclopropyl, 1-methylcyclopropyl, cyclobutyl, cyclopentyl, cyclohexyl. The cyclopentenyl and the cyclohexenyl radicals are preferred as cycloalkenyl radicals.

The new substituted azabicyclooctanes of Formula I are produced according to the invention by reacting an azabicyclooctane of the Formula II

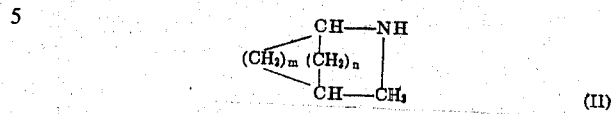
(II)

as such or in the form of an acid addition salt thereof, in the presence of an inorganic or organic base, either with a thiocarbonyl halide of the Formula III

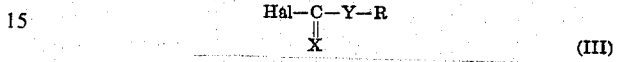
(III)

or with the individual components of such a halide, namely with phosgene or thiophosgene and the alkali-metal salt of an alkanol or mercaptan of the Formula IV

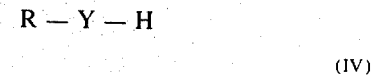
(IV)

In the Formulas II to IV, R, m, n, Y and X have the meanings given for Formula I, Hal in Formula III represents chlorine or bromine. By the reaction of an azabicyclooctane of Formula II with phosgene or thiophosgene, the N-halo(thio)carbonyl compound obtained as intermediate can be reacted directly without further purification with an alkali salt of an alkanol or mercaptan of Formula IV.

For the production of substituted azabicyclooctanes of Formula I wherein X is oxygen or sulphur and Y represents sulphur, the following modification of the process is preferred: an azabicyclooctane of Formula II is reacted as such or in the form of one of its acid addition salts in the presence of an inorganic or organic base with a compound of the formula

wherein X is oxygen or sulphur and a compound of the Formula V

wherein Hal represents chlorine or bromine.

A preferred process according to the invention for the production of substituted azabicyclooctanes of Formula I wherein X represents sulfur and Y represents oxygen, is the reaction of an azabicyclooctane of Formula II with a xanthogene-acetic acid ester of the Formula VI

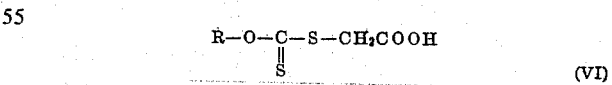
(VI)

in the presence of an inorganic or organic base. The azabicyclooctane of Formula II can be employed in the reaction as such or in the form of one of its acid addition salts.

For the reactions according to the instant invention, azabicyclooctanes of Formula II are employed either as the free base or as an acid addition salt thereof, the hydrohalides such as the hydrochlorides, hydrobromides and hydroiodides, sulfates and hydrogensulfates, phosphates and hydrogenphosphates, carbonates and hydrogencarbonates being best suited. The compounds of Formula II are known and are obtained by known methods by reduction from the corresponding cyclic imides (lactams).

For the reactions according to the instant invention, suitable inorganic bases are hydroxides and carbonates of alkali and alkaline earth metals, in particular sodium hydroxide, potassium hydroxide, sodium carbonate and potassium carbonate, furthermore the hydroxides and carbonates of lithium, barium, strontium and magnesium as well as quaternary ammonium compounds which react in the presence of water as bases, for example tetramethyl ammonium hydroxide, etc. and suitable organic bases are tertiary amines such as trialkyl amines, pyridine and pyridine bases: likewise the azabicyclooctane of Formula II employed in excess can serve to take up the hydrohalide which escapes during the reactions.

It is advisable to perform the reactions according to the invention in solvents or diluents which are inert towards the reaction components. Suitable for this purpose are: aliphatic and aromatic hydrocarbons and halohydrocarbons such as pentane, hexane, benzene, toluene, xylenes, methylene chloride, chloroform, carbontetrachloride: ether and ether-type compounds such as dialkyl ethers, tetrahydrofuran; alcohols such as ethanol; N,N-dialkylated amides and water, as well as mixtures of such solvents with water and two-phase systems of water and solvents which are immiscible or only slightly miscible in water.

Weeds which are difficult to control and deep rooted annual and perennial weeds are damaged in their growth or destroyed successfully by the active substances of Formula I. They can be applied with equal success before (preemergence) and after emergence (postemergence) of the plants. Thus field weeds, such as varieties of millet (*Panicum* sp.), varieties of mustard (*Sinapis* sp.), varieties of goose foot (*Chenopodiaceae*), slender foxtail (*Alopecurus* sp.), *Amaranthaceae*, e.g. *amaranthus* sp., grasses, e.g. *Lolium* sp., *compositae*, e.g. *Taraxacum* sp., varieties of *chamomile* (*Matricaria* sp.), can be destroyed or their growth can be hindered without damaging cultivated plants such as grain, maize, cotton, sugar beet, soyabeans.

Of the substituted azabicyclooctanes of Formula I, those which correspond to the Formula VII are particularly suitable for the control of grass-type and broad-leafed weeds in rice plantations:

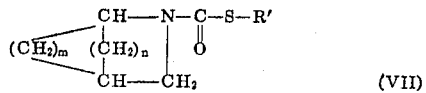

(VII)

In this formula:
R′ — represents a lower alkyl or alkenyl radical,
m — represents the number two or three, and
n — represents the number one or two,
whereby the sum of $m + n = 4$.

These active substances are effective against weeds which are difficult to control in rice plantations: for example *Echinochloa* sp., *Eleocharis* sp., *Panicum* sp., *Cyperaceae*, *Paspalum* sp., etc. in water cultivations; and in dry cultivations again *Echinochloa* sp., *Digitaria* sp., *Brachiaria* sp., *Sida* sp., *Cyperaceae*, *Acanthosperum* sp., etc. Since the active substances are, in the usual application concentrations, nontoxic for warm-blooded animals, fish and animals serving as food for fish, and since they gradually destroy the plants and thus do not drastically disturb the oxygen balance and the biological balance; they are very well suited for use in water cultivations. Furthermore the active substances have broad range of effectiveness against a large variety of aquatic weeds, e.g. emersed plants, aquatic plants with and without floating leaves, submersed plants, algae, etc. The broad range of action of the new substituted azabicyclooctanes of Formula I makes it possible to employ them in the important control of weeds and wild grasses in the areas surrounding the rice plantations such as ditches, canal beds, dams, etc. These active substances destroy not only the wild grasses named, which grow in rice fields, but also other grass-type and broad-leafed weeds. The active substances can also be applied in the preparation of the rice beds and after the emergence of the plants for the destruction of weeds which are already standing. In both water cultivations as well as in dry cultivations, the rice is not damaged by application of the new substituted azabicyclooctanes in the usual application amounts. The application amounts vary and depend upon the time of application; they lie between 0.5 and 6, preferably 4 kg of active substance per hectare, by preemergence application. Application amounts of from 10 to 30 kg of active substance per hectare are used for total destruction of all of the standing weeds, for instance on fallow ground adjacent to the cultivated field as well as for the determination of the general herbicidal activity. The use of the new active substances is not detrimental to crop rotation which is important in the cultivation of rice.

In addition such substituted azabicyclooctanes can also be employed as growth regulators, e.g. for defoliation, delay of blossoming, etc.; some of them stimulate the vegetative storage organelles, in some case simultaneously decreasing the length of growth.

The following examples illustrate the process for the production of the new azabicyclooctanes of Formula I. Unless expressly stated otherwise, temperatures are given in degrees centigrade.

EXAMPLE 1

14 g of 6-azabicyclo[3.2.1]octane hydrochloride and 8.0 g of sodium hydroxide are dissolved in 200 ml of water and covered with a layer of 200 ml of petroleum ether. The mixture is cooled to 0°–5°. At this temperature, 11.8 g of S-ethyl thiol-chloroformate are added dropwise with stirring. After 30 minutes the phases are separated, the aqueous phase is extracted with petroleum ether and dried. The solvent is evaporated in vacuum. Distillation of the yellow, oily residue yields 15.2 g of 6-(ethylthio-carbonyl)-6-azabicyclo[3.2.1] octane having a melting point of 90°–95°/0.001 mm.

EXAMPLE 2

5.7 g of carbon oxysulfide are introduced at 0°–5° into a solution of 14.0 g of 2-azabicyclo[2.2.2]octane hydrochloride and 8.0 g of sodium hydroxide in 200 ml of water. The mixture is stirred for about 1 hour at this temperature and then 10.5 g of ethyl bromide are added. The mixture is stirred for 8 hours at about 20°, the oil which forms is extracted with methylene chloride and dried. The solvent is evaporated in vacuum. The oily residue is distilled at 0.05 mm and a bath temperature of about 180°. 15.5 g of 2-(ethylthio-carbonyl)-2-azabicyclo[2.2.2] octane are obtained as an oil with refraction index $n_D^{20} = 1.5382$ b.p. 96°–100°/0.1 Torr.

EXAMPLE 3 a. A solution of 7 g of 6-azabicyclo[3.2.1]octane hydrochloride in 100 ml of water is mixed with an aqueous solution of 8.5 g of ethyl xanthogene-acetic acid and 3.8 g of sodium hydroxide. The mixture is allowed to stand for 3 days and then extracted with methylene chloride. The methylene chloride solution is washed with 0.5 N hydrochloride acid, dried and concentrated by evaporation in vacuum. 6.5 g of 6-(ethoxy-thiocarbonyl)-6-azabicyclo[3.2.1]octane are obtained as an oil having a refraction index $n_D^{20} = 1.5470$. b. A solution of 11.5 g of thiophosgene in 100 ml of benzene is added to a solution of 14.8 g of 6-azabicyclo[3.2.1]octane hydrochloride in 200 ml of water, which has been cooled with ice to 0° and then a solution of 8 g of sodium hydroxide in 60 ml of water is added dropwise with vigorous stirring and good cooling. The reaction is complete as soon as the red colour of the thiophosgene solution has disappeared and the aqueous phase has a weak alkaline reaction. The benzene layer is separated, the aqueous phase is extracted with benzene and the benzene solutions are dried with calcium chloride. A solution of 2.3 g of sodium in 100 ml of ethanol (anhydrous) is added to the benzene solution of the 6-azabicyclo[3.2.1]octane-6-thiocarbonyl chloride and allowed to stand for 2 hours. The sodium chloride which precipitates is removed by filtration and the solvent mixture is evaporated in vacuum. The resultant oil (13.5 g) is identical with that described under 3a).

EXAMPLE 4

A solution of 3.8 g of sodium hydroxide is added to a solution of 7.0 g of 2-azabicyclo[2.2.2]octane hydrochloride in 100 ml of water. The mixture is cooled to 0° and 3.62 g of carbon disulfide are added dropwise with stirring at 0°–5°. After stirring for one hour at room temperature, 3.8 g of allyl chloride are added to the reaction solution and stirring is continued for 6 hours. The precipitated oil is taken up in methylene chloride and dried. The solvent is evaporated in vacuum. The yellowish oil is distilled at 0.1 mm and a bath temperature of 190°–200°. 7.7 g of a colorless, viscous oil are obtained. The 2-(allylthio-thiocarbonyl)-2-azabicyclo[2.2.2] octane has a refraction index: $n_D^{20} = 1.6183$.

The following substituted azabicyclooctanes of Formula I can be prepared according to the methods described in the foregoing Examples Nos. 1 to 4.

| No. | Compounds: | physical data: |
|---|---|---|
| 5 | 6-(methylthio-carbonyl)-6-azabicyclo[3.2.1]octane | $n_D^{20} = 1.5415$ b.p. 85–87°/0.2 Torr |
| 6 | 6-(isopropylthio-carbonyl)-6-azabicyclo[3.2.1]octane | |
| 7 | 6-(n-butylthio-carbonyl)-6-azabicyclo[3.2.1]octane | $n_D^{20} = 1.5225$ |
| 8 | 6-(allylthio-carbonyl)-6-azabicyclo[3.2.1]octane | $n_D^{20} = 1.5447$ b.p. 100–101°/0.5 Torr |
| 9 | 6-(n-propylthio-carbonyl)-6-azabicyclo[3.2.1]octane | |
| 10 | 6-(sec-butylthio-carbonyl)-6-azabicyclo[3.2.1]octane | b.p. 98–100°/0.01 Torr |
| 11 | 6-(3'-chloropropylthio-carbonyl)-6-azabicyclo[3.2.1]octane | b.p. 124–126°/0.1 Torr |
| 12 | 6-(methylthio-thiocarbonyl)-6-azabicyclo[3.2.1]octane | $n_D^{20} = 1.6159$ |
| 13 | 6-(ethylthio-thiocarbonyl)-6-azabicyclo[3.2.1]octane | $n_D^{20} = 1.6059$ |
| 14 | 6-(n-propylthio-thiocarbonyl)-6-azabicyclo[3.2.1]octane | $n_D^{20} = 1.5946$ |
| 15 | 6-(n-butylthio-thiocarbonyl)-6-azabicyclo[3.2.1]octane | $n_D^{20} = 1.6689$ |
| 16 | 6-(allylthio-thiocarbonyl)-6-azabicyclo[3.2.1]octane | $n_D^{20} = 1.6138$ |
| 17 | 6-(2'-chlorallylthio-thiocarbonyl)-6-azabicyclo[3.2.1]octane | $n_D^{20} = 1.6176$ |
| 18 | 6-(cis-3'-chlorallylthio-thiocarbonyl)-6-azabicyclo[3.2.1]octane | $n_D^{20} = 1.6210$ |
| 19 | 6-(trans-3'-chlorallylthio-thiocarbonyl)-6-azabicyclo[3.2.1]octane | $n_D^{20} = 1.6238$ |
| 20 | 6-(trans-buter-(2')-yl-thio-thiocarbonyl)-6-azabicyclo[3.2.1]octane | $n_D^{20} = 1.6044$ |
| 21 | 6-(cyclohexen-(2')-yl-thio-thiocarbonyl)-6-azabicyclo[3.2.1]octane | $n_D^{20} = 1.5222$ |
| 22 | 2-(allylthio-carbonyl)-2-azabicyclo[2.2.2]octane | b.p. 86–92°/0.01 Torr |
| 23 | 2-(n-propylthio-carbonyl)-2-azabicyclo[2.2.2]octane | b.p. 100–102°/0.1 Torr |
| 24 | 2-(tert-butylthio-carbonyl)-2-azabicyclo[2.2.2]octane | m.p. 88–90° |
| 25 | 2-(ethoxy-thiocarbonyl)-2-azabicyclo[2.2.2]octane | $n_D^{20} = 1.5525$ |
| 26 | 2-(ethylthio-thiocarbonyl)-2-azabicyclo[2.2.2]octane | b.p. 126–127°/0.01 Torr |
| 27 | 2-(2'-chloro-allylthio-thiocarbonyl)-2-azabicyclo[2.2.2]octane | m.p. 55–56° |

The herbicidal effect of the new compounds is illustrated by the following tests:

I. Preemergence Test

The active substance, in the form of a 10 percent powder concentrate is mixed into soil in a concentration of 30 kg per hectare. Seed trays are filled with this prepared soil and the following test plants are sown therein:

millet (*Setaria italica*), mustard (*Sinanis alba*), oats (*Avena sativa*), Raygrass (*Lolium perenne*) and vetch (*Vicin sativa*).

The trays were then kept in daylight in a greenhouse at 20° to 24°C and 70 percent relative humidity.

The test plants were evaluated after 20 days and expressed according to the following scale:
9 — plants undamaged — control
1 — plants dead
8–2 — intermediate degrees of damage.

They were evaluated ater 28 days according to the scale mentioned under I. The following test plants were sown:

soyabean (*Glicine hyspida*)
Italian Raygrass (*Lolium multiflorum*)
millet (*Setaria italica*)
barnyardgrass (*Echinochloa crus galli*).

III. Selective preemergence test with weeds grown from seed

Seed trays which have been filled with soil are sprayed with an aqueous suspension of the active substance and the concentrate of the active substance is worked into a depth of about 2 cm of the soil. The following test plants were then sown:

Table I

| Compound No. | millet (*Setaria italica*) | mustard (*Sinapis alba*) | oats (*Avena sativa*) | raygrass (*Lolium perenne*) | vetch (*Vicia sativa*) |
| --- | --- | --- | --- | --- | --- |
| 1  | 1 | 2 | 1 | 1 | 2 |
| 2  | 1 | 2 | 2 | 1 | 2 |
| 4  | 1 | 2 | 2 | 1 | 2 |
| 5  | 1 | 2 | 2 | 2 | 2 |
| 6  | 2 | 2 | 2 | 2 | 3 |
| 7  | 2 | 3 | 1 | 2 | 6 |
| 9  | 1 | 2 | 2 | 1 | 2 |
| 11 | 2 | 2 | 2 | 2 | 7 |
| 12 | 2 | 4 | 2 | 4 | 5 |
| 13 | 1 | 2 | 1 | 1 | 2 |
| 15 | 2 | 3 | 3 | 1 | 8 |
| 16 | 1 | 2 | 1 | 1 | 2 |
| 17 | 2 | 2 | 2 | 1 | 3 |
| 18 | 1 | 4 | 7 | 1 | 7 |
| 19 | 2 | 3 | 3 | 1 | 7 |
| 20 | 1 | 5 | 3 | 1 | 8 |
| 21 | 2 | 7 | 7 | 1 | 8 |
| 22 | 2 | 3 | 2 | 2 | 3 |
| 23 | 2 | 2 | 2 | 2 | 3 |
| 24 | 1 | 3 | 1 | 2 | 3 |
| 26 | 2 | 2 | 2 | 2 | 3 |
| 27 | 4 | 2 | 7 | 1 | 7 |

The 10 percent powder concentrate has the following composition: 10 parts of active ingredient, 0.6 part of sodium dibutyl-naphthalene-sulfonate, 1 part of naphthalene-sulfonic acid/phenol-sulfonic acid/formaldehyde condensation product (3:2:1), 10 parts of sodium aluminium silicate, and 78.4 parts of kaolin.

II. Selective preemergence test with test plants grown from seed

Directly after sowing the test plants in seed trays, the active substances are applied to the surface of the soil as aqueous suspension, obtained from a 25 percent wettable powder. The seed trays are then kept in daylight at 22° – 25°C and 50 – 70 percent relative humidity.

weeds:
*Echinochloa crus galli*
*Setaria glanca*
*Scirpus mucronatus*
and two varieties of rice:
"IR 8" and "Ribe."

The trays were then kept in daylight at 24° – 27°C and 70 – 80 percent relative humidity. The soil was kept very moist and after 10 days was covered with a 2 – 3 cm layer of water.

After 29 days the test was evaluated according to the scale given under I.

The results of the tests II and III are given in the following tables II and III, respectively.

Table II

| compound No. | conc. kg/ha | Soyabean (*Glicine hyspida*) | Italian Raygrass (*Lolium multiflorum*) | Millet (*Setaria italica*) | Barnyardgrass (*Echinochloa crus galli*) |
| --- | --- | --- | --- | --- | --- |
| 1 | 8 | 7 | 3 | 2 | 1 |
|   | 4 | 8 | 4 | 2 | 1 |
|   | 2 | 8 | 8 | 4 | 2 |
| 2 | 8 | 7 | 2 | 2 | 1 |
|   | 4 | 7 | 2 | 3 | 2 |
|   | 2 | 7 | 3 | 4 | 2 |

Table II – Continued

| compound No. | conc. kg/ha | Soyabean (Glicine hyspida) | Italian Raygrass (Lolium multiflorum) | Millet (Setaria italica) | Barnyardgrass (Echinochloa crus galli) |
|---|---|---|---|---|---|
| 9 | 8 | 7 | 2 | 1 | 1 |
|   | 4 | 7 | 3 | 2 | 1 |
|   | 2 | 9 | 3 | 8 | 1 |
| 16 | 8 | 7 | 1 | 2 | 2 |
|    | 4 | 9 | 1 | 2 | 2 |
|    | 2 | 9 | 1 | 3 | 2 |
| 17 | 8 | 7 | 1 | 5 | 1 |
|    | 4 | 9 | 2 | 6 | 1 |
|    | 9 | 3 | 6 | 1 | 2 |
| C* | 8 | 6 | 2 | 1 | 1 |
|    | 4 | 9 | 3 | 3 | 1 |
|    | 2 | 9 | 9 | 4 | 6 |

* 3-(ethylthio-carbonyl)-3-azabicyclo[3.2.2]nonane (known from U.S. Pat. No. 3,344,134)

Table III

| Compound No. | Conc. kg/ha | rice IR 8 | rice "Ribe" | Echinochloa crus galli | Setaria glanca | Scirpus mucronatus |
|---|---|---|---|---|---|---|
| 1  | 2 | 8 | 9 | 2 | 2 | 2 |
|    | 1 | 8 | 9 | 4 | 7 | 4 |
| 2  | 2 | 3 | 9 | 2 | 2 | 2 |
|    | 1 | – | – | – | – | – |
| 23 | 2 | 9 | 9 | 3 | 2 | 2 |
|    | 1 | – | – | – | – | – |
| A* | 2 | 8 | 9 | 6 | 8 | 4 |
|    | 1 | 9 | 9 | 9 | 9 | 8 |
| B**| 2 | 9 | 9 | 9 | 9 | 7 |
|    | 1 | 9 | 9 | 9 | 9 | 9 |

* 1-(ethylthio-carbonyl)-hexamethylene-imine (known from U.S. Pat. No. 3,198,786)
** 1-(isopropylthio-carbonyl)-hexamethylene-imine (known from U.S. Pat. No. 3,198,786)

IV. Post-emergence Test

Rice of the variety "Ribe" and barnyardgrass (Echinochloacrus galli) are sown 10 mm and 1 – 5 mm deep, respectively, in seed trays which have been filled with soil.

The soil is kept very moist and after 10 days is covered with a 2 – 3 cm layer of water. As soon as the rice and baryardgrass plants have attained the height of 10 – 12 cm and 5 – 8 cm, respectively, they are sprayed with an aqueous suspension of the active substance.

The trays are then kept in daylight at 24–27°C and 70–80 percent relative himidity.

After 18 days the test was evaluated according to the scale given under I; the results are given in the following Table IV.

Table IV

| compound No. | conc. kg/ha | Rice | Echinochloa crus galli |
|---|---|---|---|
| 1  | 4 | 9 | 2 |
|    | 2 | 9 | 3 |
|    | 1 | 9 | 4 |
| 2  | 4 | 7 | 2 |
|    | 2 | 9 | 3 |
|    | 1 | – | – |
| 23 | 4 | 8 | 2 |
|    | 2 | 9 | 2 |
|    | 1 | – | – |
| B* | 4 | 9 | 3 |
|    | 2 | 9 | 5 |
|    | 1 | 9 | 9 |

* cf. Table III

The production of herbicidal compositions according to the invention is performed in a known manner by intimate mixing and grinding of active substances of the general Formula I together with suitable carriers, optionally with the addition of dispersing agents or solvents, which are inert towards the active substances. The active substances can be used and applied as dusts, scattering agents, granulates, coated granulates, impregnated granulates, homogeneous granulates, wettable powders, pastes, emulsions or solutions.

For the production of solid preparations (dusts, scattering agents, granulates) the active ingredients are mixed with solid carriers. Examples of suitable solid carriers are kaolin, talcum, bole, loess, chalk, limestone, ground limestone, Ataclay, dolomite, diatomaceous earth, precipitated silicic acid, alkaline earth silicates (fledspar and mica), calcium and magnesium sulfates, magnesium oxide, ground synthetic plastics, fertilizers such as ammonium sulfate, ammonium phosphates, ammonium nitrate, ureas, ground vegetable products such as bran, bark dust, sawdust, ground nutshells, cellulose powder, residues of plant extractions, active charcoal, etc. These carriers can be used alone or admixed with each other.

The particle size of the carriers is, for dusts advantageously up to about 0.1 mm, for scattering agents from about 0.075 to 0.2 mm, and for granulates 0.2 mm or more.

The concentrations of active substance in the solid preparations are from 0.5 to 80 percent.

To these mixtures can also be added additives which stabilize the active substance and/or non-ionic, anionic and cationic surface active substances which, for example, improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 1 to 15 ethylene oxide radicals per molecule and 8 to 9 carbon atoms in the alkyl moiety, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, and also latex products.

The water-dispersible concentrates of the active substance, i.e. wettable powders, pastes and emulsion concentrates, are compositions which can be diluted with water to any concentration desired. They consist of active substance, carrier, optionally additives which stabilize the active substance, surface-active substances and anti-foam agents and, optionally, solvents.

The concentration of active substance in these compositions is 5 to 80 percent.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones;

The active substances are so mixed, ground, sieved and strained with the additives mentioned above that, in wettable powders, the solid particle size of from 0.02 to 0.04 and in pastes of 0.03 is not exceeded. To produce emulsion concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120° and 350°C. The solvents must be practically odorless, not phytotoxic, inert to the active substances and not readily inflammable.

Furthermore, the compositions according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes and mineral oils, along or mixed with each other, can be used as organic solvents. The solution should contain the active substances in a concentration of from 1 to 20 percent.

The compositions described according to the invention can be mixed with other biocidally active compounds or agents. Thus, to broaden the range of action, the new compositions can contain, e.g. insecticides, fungicides, bactericides, fungistatics, bacteriostatics or nematocides in addition to the compounds mentioned of the general Formula I. The compositions according to the invention can also contain plant fertilizers, trace elements, etc.

The following non-limitative examples serve to illustrate the preparation of application forms of the new azabicyclo-octanes of Formula I. "Parts" mean parts by weight.

Granulate

The following ingredients are used to produce a 5 percent granulate:

5 parts of 6-(ethylthio-carbonyl)-6-azabicyclo[3.2.1]octane,
0.25 part of epichlorohydrin,
0.25 part of cetyl polyglycol ether,
3.50 parts of polyethylene glycol,
91 parts of kaolin (granular size 0.3 – 0.8 mm).

The active ingredient is mixed with epichlorohydrin and dissolved with 6 parts of acetone; then the polyethylene glycol and cetyl polyglycol ether are added. The resulting solution is sprayed onto kaolin and then evaporated in vacuum. Such granulates can be employed for the control of weeds in water rice cultivations.

Wettable Powder

The following components are used for the preparation of a) 50 percent b) 25 percent and c) 10 percent wettable powders:

a. 50 parts of 6-(allylthio-thiocarbonyl)-6-azabicyclo[3.2.1]octane,
5 parts of sodium dibutylnaphthyl sulfonate,
3 parts of napthalene sulfonic acid/phenol sulfonic acid/formaldehyde condensation product 3:2:1,
20 parts of kaolin,
22 parts of Champagne chalk;

b. 25 parts of 2-(allylthio-thiocarbonyl)-2-azabicyclo[2.2.2]octane,
5 parts of the sodium salt of oleylmethyl tauride,
2.5 parts of naphthalene sulfonic acid/formaldehyde condensation product,
0.5 part of carboxymethyl cellulose,
5 parts of neutral potassium aluminum silicate,
62 parts of kaolin;

c. 10 parts of 6-(ethoxy-thiocarbonyl)-6-azabicyclo[3.2.1]octane,
3 parts of mixture of sodium salts of saturated fatty alcohol sulfates,
5 parts of naphthalene sulfonic acid/formaldehyde condensation product,
82 parts of kaolin.

The given active ingredient is absorbed onto the corresponding carriers (kaolin and chalk) and then mixed and ground. Wettable powders having excellent wettability and suspensibility are obtained. By dilution with water, suspensions of any desired concentration of the active ingredients can be obtained from such wettable powders. Such suspensions are used for the control of weeds and wild grasses in dry rice cultivations.

Paste

The following ingredients are used for the preparation of a 45 percent paste:
45 parts of 9-(methylthio-thiocarbonyl)-9-azabicyclo[3.3.1]nonane,
5 parts of sodium aluminum silicate,
14 parts of cetyl polyglycol ether with 8 mol of ethylene oxide,
1 part of oleyl polyglycol ether with 5 mol of ethylene oxide,
2 parts of spindle oil,
10 parts of polyethylene glycol,
23 parts of water.

The active ingredient is intimately mixed and ground in suitable equipment with the additives. A paste is obtained which can be diluted with water to prepare suspensions of any desired concentration. The suspensions are suitable, for the control of weeds and wild grasses in rice and cotton plantations, etc.

Emulsion Concentrate

To prepare a 10 percent emulsion concentrate
10 parts of 6-(ethylthio-carbonyl)-6-azabicyclo[3.2.1]octane,
15 parts of oleyl polyglycol ether having 8 mol of ethylene oxide, and
75 parts of isophorone
are mixed together. This concentrate can be diluted with water to emulsions of suitable concentrations. Such emulsions are suitable for the control of weeds in cultivated plantations of grain, rice and cotton.

We claim:

1. A composition for controlling weeds and wild grasses which comprises (1) as herbicidally active substance a compound of the formula

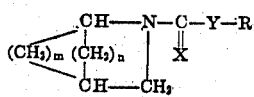

wherein R represents alkyl of from one to six carbon atoms, halogen alkyl of from one to six carbon atoms, alkenyl of from three to six carbon atoms, halogen alkenyl of from three to six carbon atoms, cycloalkyl of from 3 to 6 carbon atoms or cycloalkenyl of five or six carbon atoms; m represents the integer 2 or 3 and n represents the integer 1 or 2, whereby the sum of m and n is 4; and one of X and Y represents sulfur and the other represents oxygen or sulfur, and (2) an agriculturally acceptable carrier.

2. A composition according to claim 1, which comprises 2-(ethylthio-carbonyl)-2-azabicyclo[2.2.]octane as active substance.

3. A composition according to claim 1, which comprises 6-(methylthio-carbonyl)-6-azabicyclo[3.2.1]octane as active substance.

4. A composition according to claim 1, which comprises 6-(ethylthio-carbonyl)-6-azabicyclo[3.2.1]octane as active substance.

5. A composition according to claim 1, which comprises 6-(n-propylthio-carbonyl)-6-azabicyclo[3.2.1]octane as active substance.

6. A composition according to claim 1, which comprises 6-(allylthio-thiocarbonyl)-6-azabicyclo[3.2.1]octane as active substance.

7. A composition according to claim 1, which comprises 6-(2'-chlorallylthio-thiocarbonyl)-6-azabicyclo[3.2.1]octane as active substance.

8. A method for controlling weeds and wild grasses which comprises applying thereto a herbicidally effective amount of a compound of the formula

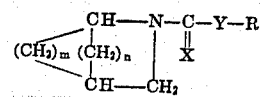

wherein R represents alkyl of from one to six carbon atoms, halogen alkyl of from one to six carbon atoms, alkenyl of from three to six carbon atoms, halogenalkyl of from three to six carbon atoms, cycloalkyl of from three to six carbon atoms or cycloalkenyl of five or six carbon atoms; m represents the integer 2 or 3 and n represents the integer 1 or 2, whereby the sum of m and n is 4; and one of X and Y represents sulfur and the other represents oxygen or sulfur.

9. A method according to claim 8 in which the compound is 2-(ethylthio-carbonyl)-2-azabicyclo[2.2.2]octane.

10. A method according to claim 8 in which the compound is 6-(methylthio-carbonyl)-6-azabicyclo[3.2.1]octane.

11. A method according to claim 8 in which the compound is 6-(ethylthio-carbonyl)-6-azabicyclo[3.2.1]octane.

12. A method according to claim 8 in which the compound is 6-(n-propylthio-carbonyl)-6-azabicyclo[3.2.1]octane.

13. A method according to claim 8 in which the compound is 6-(allylthio-thiocarbonyl)-6-azabicyclo[3.2.1]octane.

14. A method according to claim 8 in which the compound is 6-(2'-chlorallylthio-thiocarbonyl)-6-azabicyclo-[3.2.1]octane.

* * * * *

UNITED STATES PATENT OFFICE
CERTIFICATE OF CORRECTION

Patent No. 3,820,974    Dated June 28, 1974

Inventor(s) Elmar Sturm and Christian Vogel

It is certified that error appears in the above-identified patent and that said Letters Patent are hereby corrected as shown below:

In the title: delete "CARBENYL" and substitute "CARBONYL"

The following should be inserted in the heading:

Claims priority, application Switzerland

August 14, 1969, No. 12,409/69

Column 13, claim 2, line 55, delete "[2.2]" and substitute

-- [2.2.2] --.

Signed and sealed this 18th day of February 1975.

(SEAL)
Attest:

RUTH C. MASON
Attesting Officer

C. MARSHALL DANN
Commissioner of Patents
and Trademarks